United States Patent Office.

EMERSON McMILLIN, OF IRONTON, OHIO.

Letters Patent No. 100,309, dated March 1, 1870.

IMPROVEMENT IN THE PURIFICATION OF COAL GAS,

The Schedule referred to in these Letters Patent and making part of the same

*To all whom it may concern:*

Be it known that I, EMERSON McMILLIN, of Ironton, in the county of Lawrence, and State of Ohio, have invented a new and improved Mode of Purifying Coal Gas for Illuminating Purposes; and I do hereby declare that the following is a full and exact description thereof, the same not admitting of illustration by drawings.

The nature of my invention consists in removing the sulphur from coal gas by means of grindstone dust, and in removing all the usual impurities from coal gas by employing grindstone dust in connection with dry lime.

To enable others skilled in the art to use my invention, I will proceed to describe the material which I employ, the mode of using it, and its action when so used.

The grindstone dust which I use, is that obtained from factories where iron and steel tools or implements are ground. It is found in large quantities in such factories, and is at present a waste material having no commercial value. It consists, for the most part, of minute particles of iron and steel intimately mixed with silicic acid. It is generally found in clods or aggregated lumps, and is of a brown color.

In using this dust, I do not need any special apparatus, the forms of purifiers, &c., now in general use are suitable therefor. Since this dust does not absorb carbonic acid, I use lime for that purpose, in the proportion of one-sixth in bulk of lime, to five-sixths of the dust.

The gas may be brought into contact with the lime either before it is passed through the dust or afterwards, and the lime may be used in the same purifier or in a separate one.

In small works I fill the two lower or small trays with dry lime, and the four upper or large trays of a set of six trays with grindstone dust, the larger of each being about two inches thick. The object of using this arrangement is to bring the gas first through the lime, so that any tar or naphthaline that may escape through the washer and condenser shall be arrested by the lime, and so not allowed to pass into the grindstone dust, which these impurities would render useless. If the gas be passed through a tray of loam, these impurities will be arrested and the lime may be used in the upper tray. When the gas has passed through this material the usual time allowed for purifying with dry lime, the dust must be removed and replaced by fresh dust. The dust is then of a black color, and is charged with impurities, but it is not as offensive as lime under similar circumstances, and it can be handled and can be placed in heaps without creating a nuisance.

To restore its purifying qualities I pile it in a conical heap upon a core, so that it is about one inch thick upon the core, and is thus exposed to the action of the atmosphere. In this position the dust must not get wet, or it will not heat sufficiently, and the sulphur will not be driven off, unless the weather be warm, but in dry weather, and particularly when exposed to the direct rays of the sun, the dust heats, changes color from black to reddish, and is restored to its original qualities for purifying. Whether the dust be used for purifying, or be exposed to be itself restored, it must not be saturated with water, but yet it must be moist, or it will not act or be acted on.

When the dust is restored by exposure to the atmosphere, it gradually loses its purifying qualities, until, after about six months use, it becomes comparatively inert. It is, however, fully restored to its active qualities by being exposed for a few minutes to a red heat in a retort, and this mode of restoration may apparently be employed to any extent desired, so that one supply of dust, allowance being made for waste in handling, will last for an unlimited time.

In large works I prefer having two sets of purifiers, and having the lime in distinct and separate purifiers from those in which the dust is used, so that one set may be in use purifying gas, while the other set is employed in restoring the dust that has been used.

The mode of doing this is to pass a current of hot air through the dust lying in the trays of the purifier, which carries off with it the sulphur and other impurities from the dust and changes its color from black to red, and so restores to it its purifying qualities. By this means all the expense of rehandling and removing the dust, together with the waste incident thereto, is saved, and the lime purifiers only would require cleaning out and recharging daily. When the dust has been purified in this way, it is quite dry, and consequently comparatively inert as a purifying agent. To moisten it, I pass a current of steam through it after allowing it to cool, and the steam condensing in the dust moistens it, care being taken not to continue the operation long enough to make the dust wet.

The mode of sending the hot air or the steam through the dust, does not need to be described as any gas engineer can arrange apparatus to do so without the necessity of inventing any device.

The purifying properties of this dust seem to depend partly upon its chemical constituents, partly upon its mechanical composition, and partly upon a galvanic action developed by the presence of a metal and acid under the conditions of heat and moisture. The chemical constituents are iron and silicic acid, with some unimportant additions.

The chemical action of iron, or its oxide, in purifying gas, has been long known, its strong affinity for sulphur being its efficient property. But the action of silicic acid, either alone or in conjunction with iron, is not well known, yet it acts upon the gas feebly when alone, and powerfully in connection with iron, as in this dust. The mechanical composition of this dust is the best calculated for exposing a large surface of the purifying agent to the action of the gas.

Both the iron and the silicic acid are in the form of microscopic particles, which therefore have the maximum of surface exposed to the gas, and which yet form a porous layer through which gas can pass freely, and which also are so intimately mixed that the particles of iron are kept apart and cannot cement together as they absorb sulphur from the gas. Then the alternation of metallic particles, and acid particles under the conditions presented in a purifier, of heat and moisture, develops a galvanic action throughout the mass, which favors the absorption of sulphur by the iron particles, and of ammonia, &c., by the silicic acid.

This mode of purification is an improvement on the oxide of iron process, and upon that process in which iron turnings, borings, &c., are used, because the oxide of iron is an impalpable powder which packs together, and is not porous enough for gas to pass through when in a layer of sufficient thickness. Also because the oxide of iron in changing to the sulphate in the purifier, cakes together, and requires to be broken up before it can be used again after expelling the sulphur. Then turnings or borings present so small an amount of surface in proportion to the weight of the mass used, that the use of them is attended with great labor. Also the interstices between the pieces of iron are so large, that much of the gas escapes without coming in contact with the iron. Further, both oxide of iron and iron turnings have a commercial value, and are expensive to get. They are also expensive in rehandling, while grindstone dust is a waste material, having no commercial value, and is easily used without the expense of rehandling.

What I claim as my invention, and desire to secure by Letters Patent, is as follows:

1. The mode herein substantially described, of purifying coal gas for illuminating, by passing it through grindstone dust alone, or after or before the gas has passed through dry lime.

2. The mode herein substantially described, of restoring the purifying properties of grindstone dust after it has been used, so that it may be repeatedly used as often as may be desired.

3. The employment of any combination of iron and silicic acid, similar in its mechanical properties to grindstone dust, for the purpose of purifying coal gas for illuminating.

E. McMILLIN.

Witnesses:
BENJAMIN GARVEY,
S. W. MORRIS.